(12) United States Patent
Pantigny (10) Patent No.: US 7,358,996 B2
(45) Date of Patent: Apr. 15, 2008

(54) DEVICE FOR DETECTING A PHOTONIC FLUX WITH SELF-ADAPTIVE SCANNING

(75) Inventor: Philippe Pantigny, Claix (FR)

(73) Assignee: Commissariat a l'Energie Atomique, Paris (FR)

( * ) Notice: Subject to any disclaimer, the term of this patent is extended or adjusted under 35 U.S.C. 154(b) by 934 days.

(21) Appl. No.: 10/149,792

(22) PCT Filed: Oct. 12, 2001

(86) PCT No.: PCT/FR01/03165

§ 371 (c)(1), (2), (4) Date: Nov. 25, 2002

(87) PCT Pub. No.: WO02/32111

PCT Pub. Date: Apr. 18, 2002

(65) Prior Publication Data

US 2003/0128398 A1  Jul. 10, 2003

(30) Foreign Application Priority Data

Oct. 13, 2000  (FR) ................... 00 13138

(51) Int. Cl.
*H04N 3/14* (2006.01)
(52) U.S. Cl. .................. 348/295; 348/208.1; 348/187; 348/295; 358/471; 358/482
(58) Field of Classification Search ............... 348/187, 348/295; 358/471, 474, 482; 250/208.1
See application file for complete search history.

(56) References Cited

U.S. PATENT DOCUMENTS

| | | | | |
|---|---|---|---|---|
| 4,284,892 A | * | 8/1981 | Hulot et al. ................. | 250/388 |
| 4,779,005 A | * | 10/1988 | Arnold ........................ | 348/295 |
| 5,267,053 A | | 11/1993 | Potucek et al. | |
| 5,539,779 A | * | 7/1996 | Nagahori .................... | 375/317 |
| 5,828,408 A | * | 10/1998 | Mottin et al. ............... | 348/295 |
| 6,847,036 B1 | * | 1/2005 | Darling et al. .............. | 250/291 |

FOREIGN PATENT DOCUMENTS

EP  0 585 124  8/1993

OTHER PUBLICATIONS

French Preliminary Search Report, FR 0013138.

* cited by examiner

Primary Examiner—David Ometz
Assistant Examiner—Usman Khan
(74) Attorney, Agent, or Firm—Thelen Reid Brown Raysman & Steiner LLP

(57) ABSTRACT

Scanning type device for detection of a photonic flux emitted by a scene containing at least one acquisition channel (V) comprising:
  several useful detectors (1) aligned with the scanning, each associated with a preamplifier (2), each receiving the same fraction of photonic flux from the scene and supplying information to the preamplifiers,
  a time delay integration device (4), integrating signals emitted by preamplifiers.

The channel (V) cooperates with at least one calibration device (8) comprising:
  a calibration detector (9) on the input side of the useful detectors (1), receiving the fraction of photonic flux before the detectors (1),
  a device for generating a stimulus (11) from a fraction of the flux,
  and with at least one stimulus distribution device (13) for applying it to preamplifiers (2) before they have received the information from the associated useful detectors.

Application particularly to imagery or to spectrometry.

13 Claims, 5 Drawing Sheets

DEVICE FOR DETECTING A PHOTONIC FLUX WITH SELF-ADAPTIVE SCANNING

DESCRIPTION

1. Technical Domain

The invention relates to a scanning type device for the detection of a photonic flux emitted by a scene operating in continuous mode and known as TDI (Time Delay Integration), which is also called a time delay integration mode in French.

The invention is used particularly for applications in scanning cameras such as movie cameras, in the visible spectral, infrared or even X-ray domain, or in spectrometry.

It is particularly useful in applications in which it is necessary to record a maximum amount of information after a single scan of the scene, for example in space applications during earth observations or in the field of panoramic dental radiography.

2. State of Prior Art

The cameras considered in this patent comprise an optical scanning device and a detection device with several detectors sensitive to the photonic flux from the scene for which an image is to be acquired. These detectors are generally laid out in the form of a matrix defining one or several acquisition channels V perpendicular to the direction of scanning, each acquisition channel comprising a given number of detectors aligned with the scanning direction. The observed scene emits a photonic flux. The optical device animated by a scanning movement scans the movie camera observation scene, receives this photonic flux and sends it onto the detectors. The detectors on one channel actually receive a fraction of the photonic flux in turn originating from a particular element of the scene to be scanned. Each element of the scene is detected in sequence by all detectors on a channel. Information about an observed element of the scene is obtained by making a time delay synchronous integration of the optical scanning, of the contributions of the channel detectors. This arrangement can significantly improve the signal to noise ratio of elements of the image at the output from the acquisition device.

Figure 1:
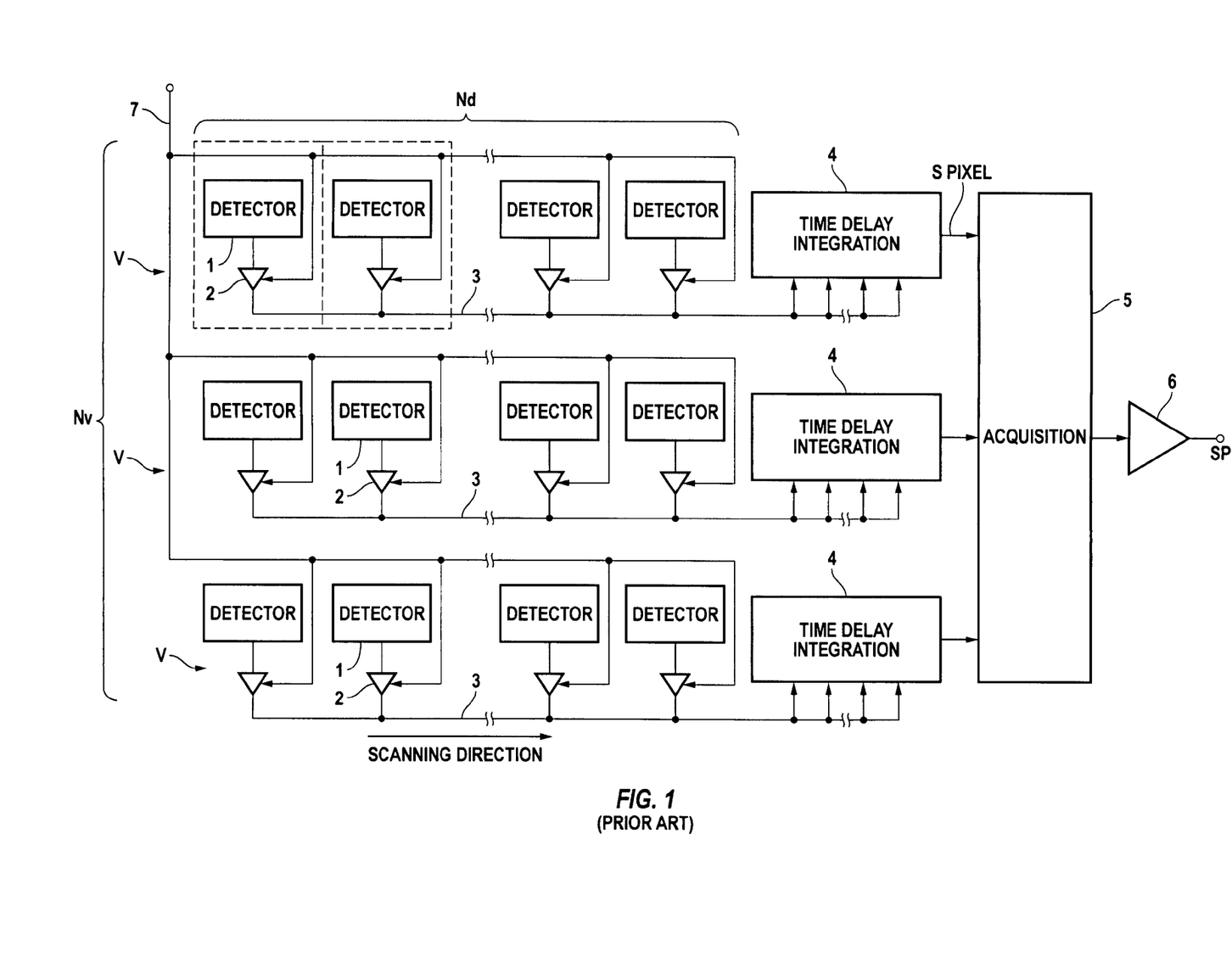
FIG. 1 (already described), a known type of a photonic flux detection device.

Refer to FIG. 1 that diagrammatically shows the arrangement of detectors 1 of a known type of scanning photonic flux detection device. Nd detectors on a channel V and Nv channels can be distinguished. The detectors may be quantic or thermal detectors.

In quantic detectors, the incident photon flux is converted into holes or electrons. These quantic detectors may be made, for example, from photodiodes or photoconductors.

Thermal detectors output an electrical signal that varies as a function of the temperature of the incident photonic flux. For example, they can be made from variable resistances as a function of the temperature, which is the case for resistive bolometers operating in the infrared range.

These detectors output information that is processed by a set of analogue and/or digital functions made on an integrated circuit called the read circuit that can be made using the CMOS technology. In the case of a photodiode, it outputs a photocurrent that is assumed to be directly proportional to the fraction of the incident photonic flux. It is assumed that the detectors 1 in FIG. 1 are photodiodes.

Each detector 1 is associated with a preamplifier 2 that receives information and that reformats it into an electrical signal representing the fraction of photonic flux received that can be used by a time delay integration device 4. The preamplifier 2 is located close to the detector 1 with which it is associated. The preamplifier 2 fixes the rest point of the detector 1. A detector-preamplifier assembly will subsequently be called the photosite.

The electrical signals at the output from the preamplifiers 2 of a channel V are sampled and directed to the time delay integration device 4 through a connection 3 common to all preamplifiers of the channel V or bus 3. The time delay integration device 4 outputs a signal Spixel corresponding to the analyzed element in the scene. The time delay integration device 4 is offset at one end of the line that is formed by the photosites, away from the detection area. It is separate from the photosites matrix.

The signals Spixel of all channels V are then processed in an acquisition system 5, 6 that manages these signals and outputs information to a user device, this information possibly being a reconstructed image accessible through the user device (not shown). This acquisition system comprises a multiplexer 5 that receives the signals Spixel from all channels V as input, and the output of which is connected to an amplifier 6 that outputs a signal SP to the user device.

The preamplifier 2 makes the information that it receives from the detector 1 compatible with the time delay integration device 4, particularly by amplifying it. It usually performs a conversion function, for example conversion from current into voltage or into charges when the detector is quantic. The preamplifiers 2 form part of the read circuit.

The preamplifiers 2 may be of different types, for example a charge amplifier, with direct or indirect injection circuit, or with current mirror.

In FIG. 1, it is assumed that the preamplifiers 2 are of the charge integrator type.

The detectors 1 may be either monolithic or hybridized with the read circuit. If they are monolithic, the detectors are made within or on the read circuit. If they are hybridized, the detectors are made on a separate circuit that is interconnected to the read circuit by appropriate technologies, for example such as hybridization by microballs.

The time delay integration principle requires that each detector contributes to generation of the signal Spixel with the same weight. The preamplifiers 2 must then have the same conversion and amplification characteristics at the moment at which they process the same element in the scene. This means that they must have the same transfer function during this processing.

This transfer function plays an important role in operation of the detection device since it fixes the maximum allowable contrast by the device, in other words the difference between the incident flux at saturation and the incident flux equivalent to the noise in the read circuit. This transfer function also determines the signal to noise ratio at the output from the preamplifier, which specifies the electrical characteristics of the time delay integration device 4 and the acquisition system 5, 6.

One disadvantage of this structure is that it cannot be used to obtain very high quality information on the scene, either when elements within the scene to be observed are very highly contrasted, or when the contrast varies widely from one observation to another.

Since all preamplifiers perform the same transfer function, those that receive high incident flux intensities may be saturated, while the signal to noise ratio may be very low for those for which the flux intensity is low.

There are preamplifiers in which the transfer function can be adapted by an electrical signal or a stimulus. It has been proposed that this type of preamplifier should be used in known detection devices. The stimulus is distributed through a control bus 7 to all preamplifiers 2 as illustrated in FIG. 1.

In order to be able to process scenes for which the emission characteristics vary considerably with time, the stimulus between 2 photos can be modified in order to adapt it to each scene to be observed. However, this application requires a priori knowledge of the characteristics of the scene before the photo, which can cause a problem. This improvement is inoperative during detection of a scene for which the elements are highly contrasted.

DESCRIPTION OF THE INVENTION

The purpose of this invention is to propose a device for detection of a photonic flux that can be used when the elements of the scene to be observed are highly contrasted within a single observation, and/or when the contrast varies considerably between two observations, without any a priori knowledge of the photonic flux intensity from elements in the scene to be observed before the photo is taken.

The detection device achieves this by being self-adaptive, in other words instead of collectively controlling the transfer function of all preamplifiers, the transfer function of each preamplifier can be controlled individually as a function of the photonic flux intensity received by the associated detector.

More precisely, the device for detection of a photonic flux emitted by a scene according to the invention comprises at least one acquisition channel comprising:
  several useful detectors along a line parallel to the direction of scanning, each associated with a preamplifier, and each of which will receive the same fraction of photonic flux originating from the scene to be observed, and to supply information representative of the fraction of photonic flux received to each associated preamplifier, these preamplifiers outputting an electrical signal in response to the information and with a transfer function that can be modified by the application of a stimulus,
  a time delay integration device, integrating signals emitted by the channel preamplifiers,
  characterized in that the channel cooperates with at least one calibration device comprising:
  a calibration detector situated on the input side of useful detectors with respect to the scanning direction, that will receive the fraction of photonic flux before the useful detectors on the channel, and
  a stimulus generation device starting from the fraction of flux received by the calibration detector,
  and with at least one device for distribution of the stimulus synchronously with scanning to apply the stimulus to preamplifiers on the channel before they have received the information from the associated useful detectors.

This invention also relates to a scanning type process for detection of a photonic flux, starting from at least one acquisition channel comprising useful detectors aligned with the direction of scanning, each associated with a preamplifier and each of which will receive the same fraction of photonic flux from a scene to be observed and to output information representative of the fraction of the received photonic flux to the associated preamplifiers, these preamplifiers performing a transfer function that can be modified by the application of a stimulus and outputting a signal, in which:
  the fraction of the photonic flux originating from the scene to be observed is collected in a calibration detector on the input side of the useful detectors, before it reaches the useful detectors,
  the stimulus is generated starting from the collected fraction of the flux,
  this stimulus is distributed synchronously with the scanning to the channel preamplifiers before they have received information from useful detectors in order to individually check their transfer function,
  the signals output by the channel preamplifiers are integrated in a delayed manner.

BRIEF DESCRIPTION OF THE DRAWINGS

Other characteristics and advantages of the invention will become clear while reading the following description given for illustrative purposes and in no way limitative, with reference to the figures in the drawings attached in the appendix that represent.

Identical or similar elements shown in these figures are marked with the same reference.

DETAILED DESCRIPTION OF PARTICULAR EMBODIMENTS

Figure 2:
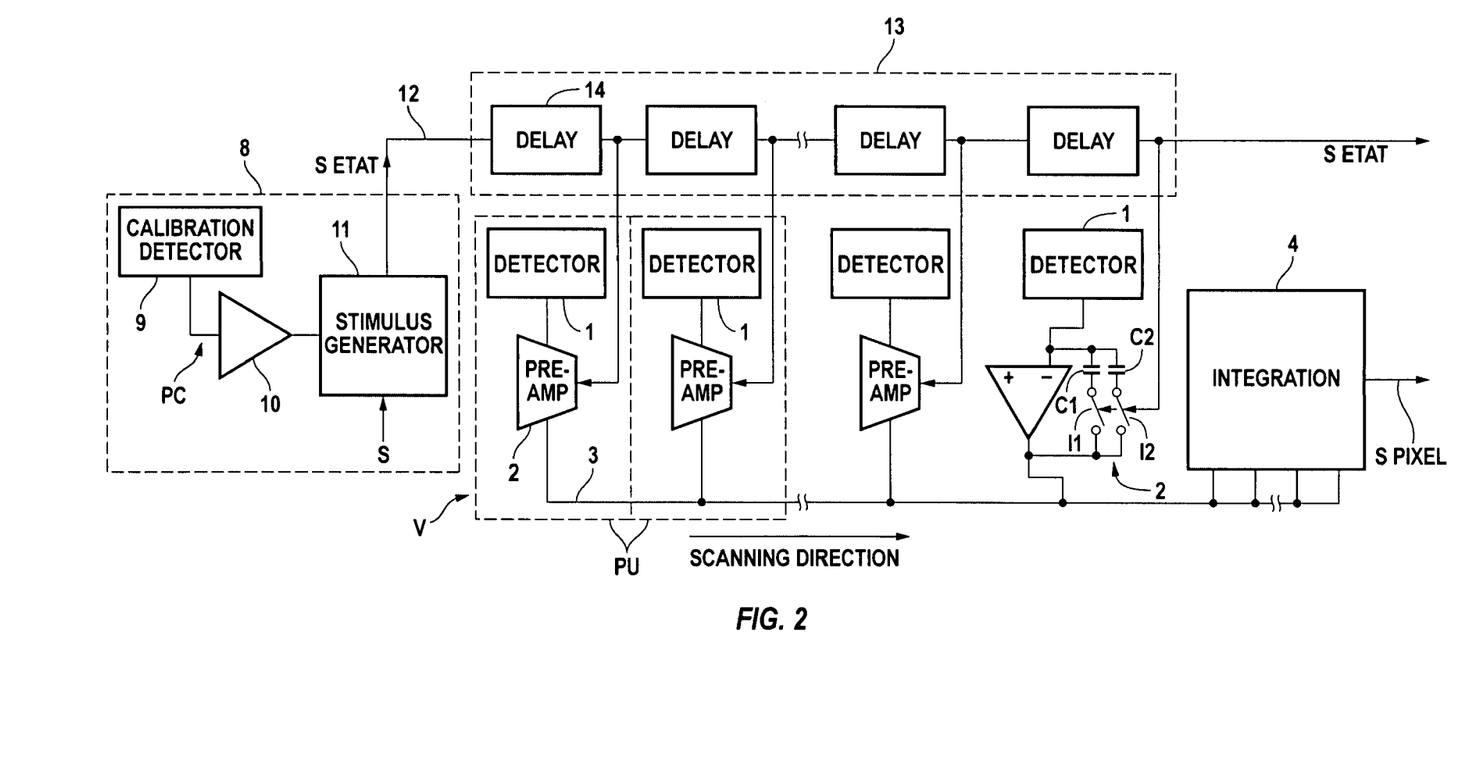
FIG. 2 shows a channel of an example of a photonic flux detection device according to the invention.

Refer to FIG. 2 which shows details of a channel V of a device for detection of a photonic flux according to the invention. This channel V comprises several useful detectors 1 aligned parallel to the direction of the scanning marked by an arrow, as shown in FIG. 1. The useful detectors 1 each receive the same fraction of photonic flux from elements in the scene to be observed. Each useful detector 1 is associated with a preamplifier 2 to form a useful photosite PU.

In the example described, it is assumed that the useful detectors 1 are photodiodes and that the preamplifiers 2 are charge integrator amplifiers. The information output by the photodiodes in response to reception of the fraction of photonic flux is a photocurrent that will be integrated by the preamplifier.

As in prior art, the preamplifiers 2 of the channel V output a signal to a time delay integration device 4 through a connection 3 common to the preamplifiers of the channel V, or bus. In general, samples are applied to the time delay integration device through the bus 3. These samples can be obtained using switches (not shown) connected between the output from each preamplifier 2 and the bus 3.

The time delay integration device 4 combines analogue delay line and analogue adder functions.

The time delay integration device 4 may comprise a set of synthesized analogue integrators using techniques called switched capacitors, in order to perform its function as an adder. This point is not described in detail since it is known in itself.

The preamplifiers 2 are such that their transfer function can be controlled electrically by the application of a stimulus Sétat. In the case of a charge integrator type preamplifier, its transfer function is controlled possibly by providing its counter-reaction loop with several capacitor-switch series assemblies installed in parallel, these capacitors called integration capacitors having different capacitance values.

One of the capacitors is selected by controlling closure of the associated switch by applying the stimulus Sétat, the other switches remaining open. In FIG. 2, only the right preamplifier has been shown in detail and shows two sets of capacitors-switches C1-I1, C2-I2 to control its transfer function. For example, the value of the capacitor C1 may be 0.1 pF and the value of capacitor C2 may be equal to 1 pF.

Depending on the type of preamplifier 2, its transfer function may be controlled by selecting one of several current or voltage levels, or the gain of one current mirror among several.

According to the invention, each channel V cooperates with at least one calibration device 8 and at least one device 13 for distribution of the stimulus Sétat to the channel preamplifiers. The calibration device 8 comprises a calibration detector 9 and a device 11 for generation of the stimulus Sétat for use by preamplifiers 2 associated with the useful detectors 1.

The calibration detector 9 is located on the input side of the useful detectors, along the scanning direction. It is in line with the useful detectors 1. In this way, it receives the fraction of photonic flux originating from the scene to be observed before the useful detectors of the channel V.

In response to this received fraction of photonic flux, the calibration detector 9 outputs information to be received by the stimulus generation device 11. The calibration detector 9 may be quantic or thermal, like all useful detectors. It is simpler if the calibration detector is identical to the other useful detectors, but other choices are possible.

Apart from the fact that its geometric shape may be different from the shape of the useful detectors, its distance from the closest useful detector may be adjusted to optimize the duration of the calibration (measurement of the incident fraction of photonic flux and generation of the stimulus) as a function of the scanning constraints.

For example, a photonic flux detection device operating in the visible domain may comprise a photodiode as the useful detector and a phototransistor or a photogrille as the calibration detector.

In the same way as useful photosites PU, a calibration preamplifier 10 may be associated with the calibration detector 9 to form a calibration photosite PC. It is installed between the calibration detector 9 and the stimulus generation device 11. It receives information from the detector 9 and outputs a signal compatible with the stimulus generation device 11. The calibration preamplifier is designed to operate under linear conditions in the worst cases of incident illumination.

In the example described, it is assumed that the calibration preamplifier 10 is of the charge integrator type. In this case, the value of the capacitance of its integration capacitor is chosen to obtain this operation under linear conditions. It would have been possible to choose another type of preamplifier, in the same way as was described for the preamplifiers 2 of the channel V.

The stimulus generation device may make a comparison between a signal representative of the fraction of photonic flux received by the calibration detector, and at least one threshold.

In the example in FIG. 2, it is assumed that the stimulus generation device 11 is a comparator that receives the signal from the pre-amplifier 10 and compares it with the threshold S.

If the signal is less than the threshold S, the stimulus Sétat will have the effect of selecting the capacitor C1 at preamplifiers 2, otherwise it will have the effect of selecting the capacitor C2 at these preamplifiers. The capacitor C1 is selected by closing switch I1 and leaving switch I2 open. The switch positions are inverted when the capacitor C2 is selected.

The output from the stimulus generation device 11 is connected through a connection 12 to the input to the distribution device 13 that distributes the stimulus to preamplifiers 2 on the channel. The stimulus Sétat is collected at the output from the distribution device 13. The distribution device 13 may be made by a delay line comprising one delay cell 14 for each preamplifier 2 on the channel V.

In the example, these delay cells 14 are installed in series. Each preamplifier 2 is connected to the output from one of the delay cells 14. The first cell through which the stimulus passes is connected to the preamplifier associated with the first useful detector 1 illuminated by the fraction of incident flux during scanning.

The delay added by the cells 14 is adapted such that the stimulus is propagated to the preamplifiers 2 synchronously with the scanning. If the scanning is uniform, the cells 14 all introduce the same delay.

The preamplifiers 2 must be operational when they receive the photosignal from the associated detector 2, to achieve the best possible conversion before transmitting it to the time delay integration device 4.

The process for operation of the photonic flux detector according to the invention may be summarized as follows. When taking a picture on a channel, due to scanning, the calibration detector 9 is illuminated by a fraction of the photonic flux, followed by successive useful detectors 1. In response to this flux fraction, each of the detectors 9, 1 outputs information and this information is staggered in time, the first information being output by the calibration detector 9. The device 11 starts from the information from the calibration detector 9 and generates a stimulus that is distributed through the device 13 to the various preamplifiers 2 of the channel V to control their transfer function as well as possible. They receive this stimulus before the information from the useful detector 1 associated with them arrives.

We will now describe the variation of different signals from two successive useful photosites in a detection device according to prior art using chronograms, for example as shown in FIG. 1. It is assumed that we are interested in the first two photosites surrounded in FIG. 1 by the bold dashed lines.

Figure 4:
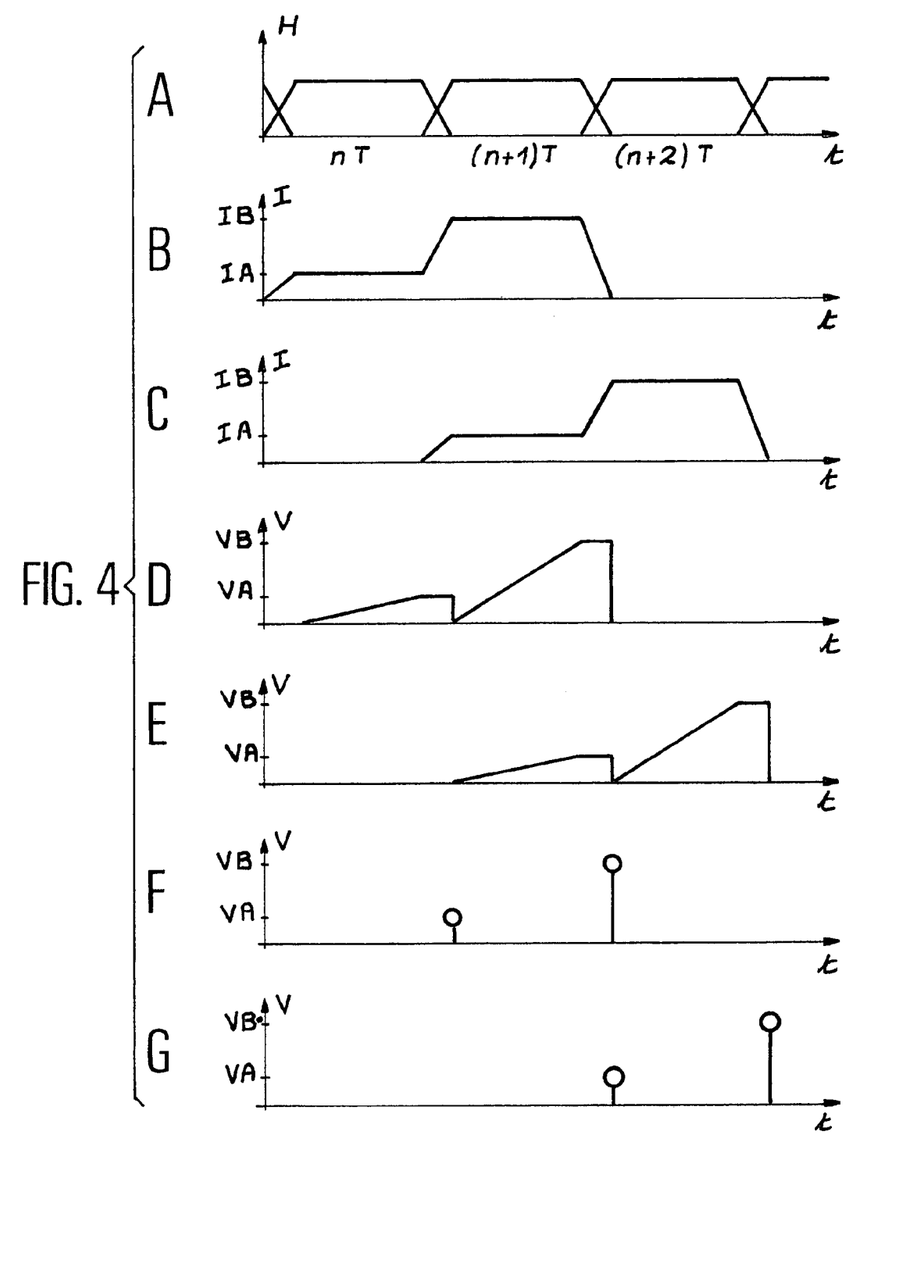
FIG. 4 shows different chronograms, showing the clock governing the optical scanning of the detectors (A), the variation of the photonic current generated by two successive detectors (B and C), the variation of the output voltage from the preamplifiers associated with two detectors (D and E), and samples of the previous voltages received by the time delay integration device (F and G), for the detection device in FIG. 1.

Refer to FIG. 4. Curve A shows clock signals governing scanning. The flight time is denoted T, the time interval taken by the fraction of photonic flux to move from one detector to the next. This flight time depends on the distance between detectors and the scanning speed.

Curves B and C illustrate the intensity photocurrent IA then IB for the first and second photosites considered respectively, output by their corresponding detectors exposed to the fraction of the photonic flux output from a first element of the scene to be observed and then a second element of the scene to be observed. It is assumed that the amplitude of the fraction of the flux from the first element is less than the amplitude of the fraction of the flux from the second element.

Curves D and E show the variation of the voltage output by the preamplifiers of the two photosites. The output voltages from the preamplifiers at the end of the integration are similar to the photocurrent since their transfer function was not modified while taking the pictures.

Curves F and G show samples of the output voltage from preamplifiers to be sent to the time delay integration device.

Figure 5:
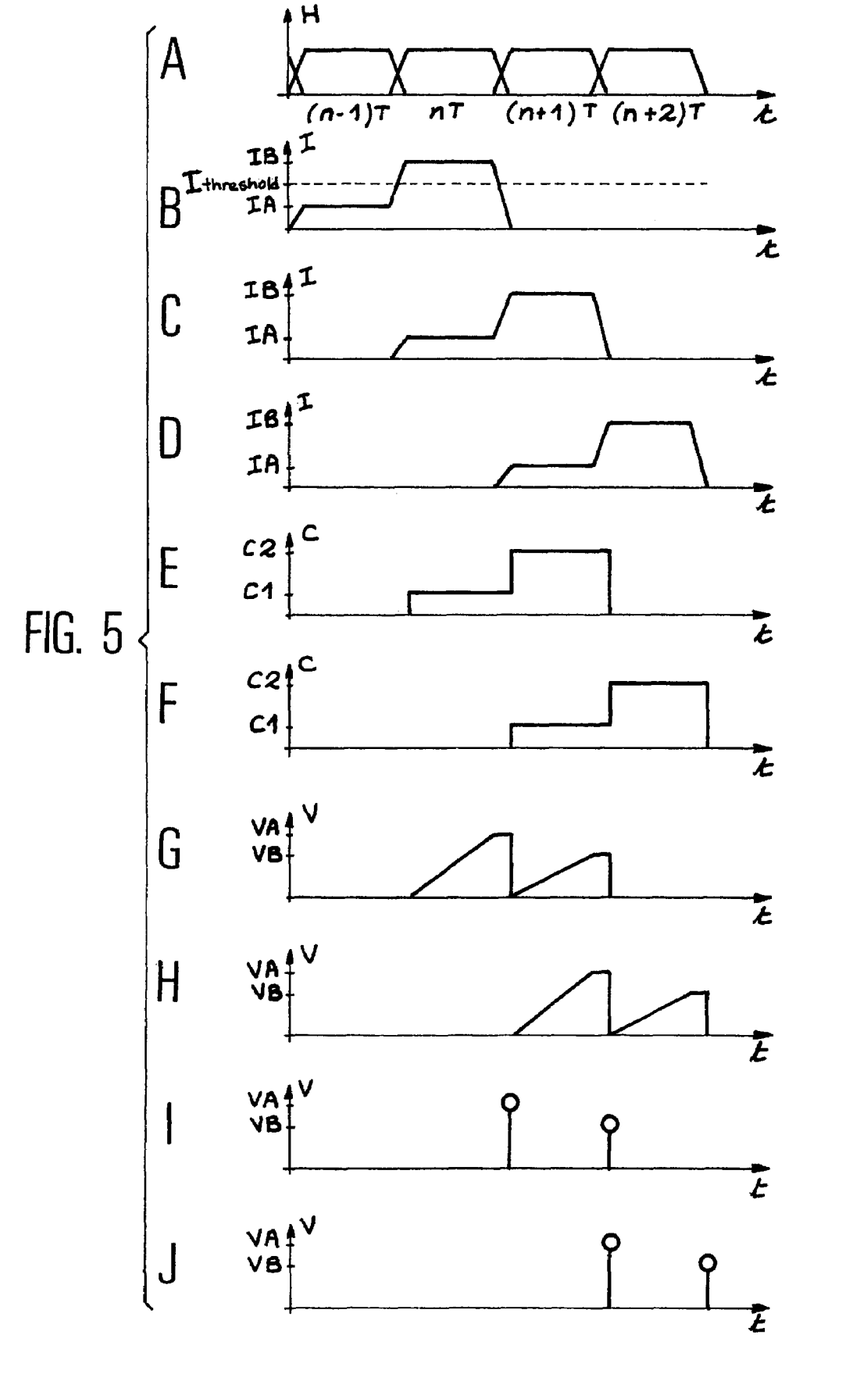
FIG. 5 shows chronograms illustrating the clock governing the optical scanning of the detectors (A), the variation of the photonic current generated by the calibration detector (B), the variation of the photonic current generated by two successive useful detectors (C and D), the selection of the integration capacitor in preamplifiers associated with the two useful detectors (E and F), the variation of the output voltage from the preamplifiers associated with the two useful detectors (G and H), and samples of the previous voltages received by the time delay integration device (I and J), for the detection device in FIG. 2.

We will now refer to FIG. 5. It relates to the calibration photosite PC and the two useful photosites PU surrounded by bold dashed lines in FIG. 2.

Curve A is similar to curve A in FIG. 4 and shows the clock signals governing scanning.

Curves B, C and D illustrate the photocurrent with intensity IA and then IB output by their detectors exposed to the fraction of photonic flux originating from a first element in the scene to be observed and then a second element of the scene to be observed, for the calibration photosite PC and for the first and second useful photosites PU considered. It is assumed that the amplitude of the fraction of flux in the first element is less than the amplitude of the fraction of flux in the second element. The photocurrent $I_{threshold}$ corresponding to the threshold S of the comparator 11 is shown on curve B.

Curves E and F show the selection of the integration capacitors into the preamplifiers for the two useful photosites PU. This represents the state of the preamplifiers. The changeover from capacitor C1 to capacitor C2 takes place just before a photocurrent greater than IC is input to the preamplifier concerned.

Curves G and H show the variation of the voltage at the output from the preamplifiers of the useful photosites PU concerned. The amplitude of these voltages is no longer similar to the photocurrent, as in the case of a collective control over the state of the preamplifiers, since the photocurrent was integrated using integration capacitors with different capacitance values.

Finally, curves I and J illustrate samples of the output voltage of preamplifiers to be sent to the time delay integration device.

Measurements have shown that collective control of the transfer function limits the contrast between two items of information to a factor of between 10 and 100 depending on the value of the integration capacitor used, whereas with individual control according to the invention, information with a contrast of a factor of up to 1000 can be obtained.

Figure 3:
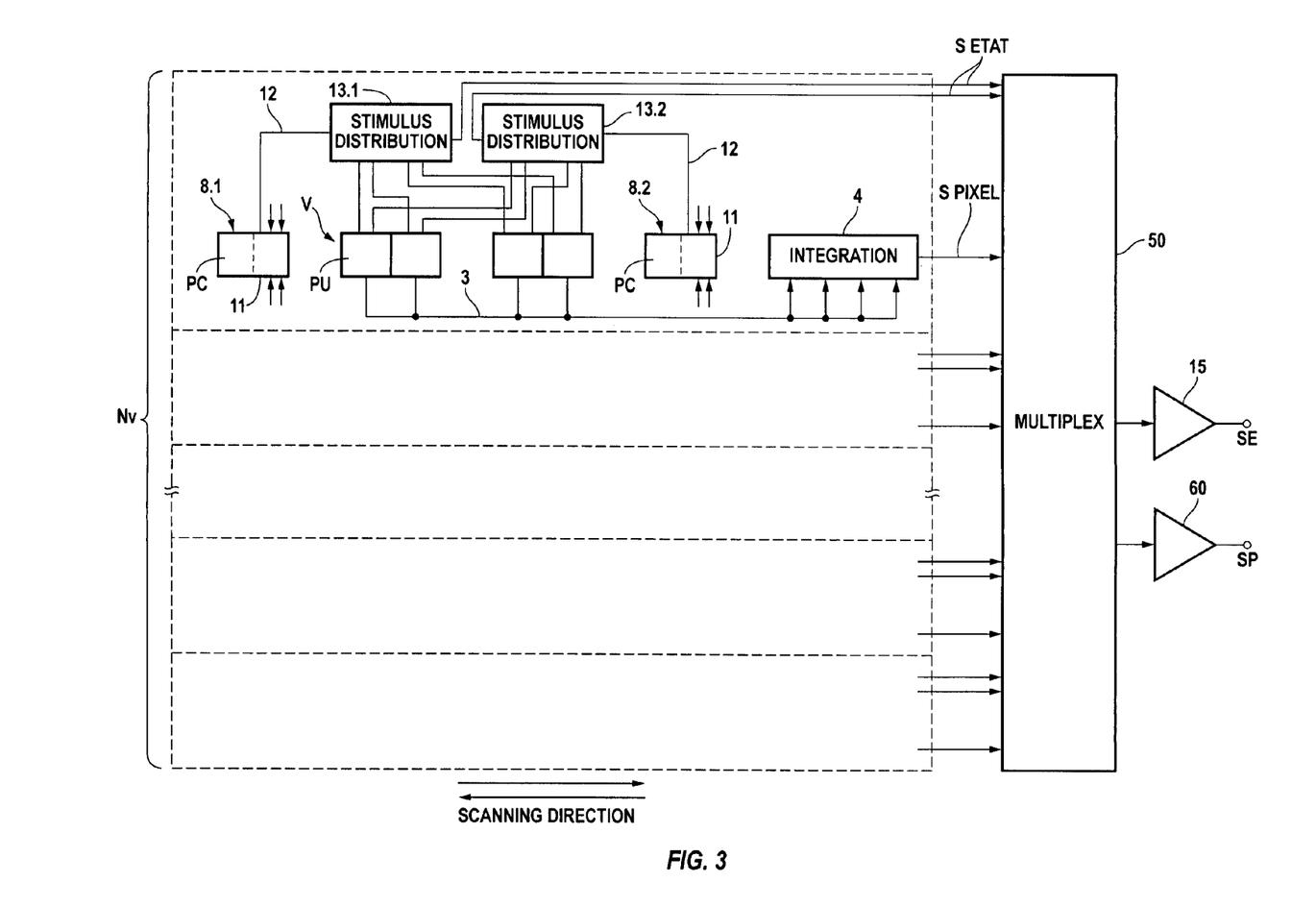
FIG. 3 shows another example of a detection device according to the invention.

We will now refer to FIG. 3 that shows another example embodiment of a detection device according to the invention. As in FIG. 1, the detection device comprises Nv channels and each channel has Nd useful detectors and therefore Nd useful photosites PU.

The photonic flux detection device is capable of operating with two-directional scanning. Scanning may be done, for example, first in one direction and then in the other direction, while remaining parallel to the detector channels. This is done using two calibration devices 8.1, 8.2 for each channel V, one being placed at one end of the channel and the other at the other end. Each calibration device 8.1 and 8.2 is connected to a stimulus distribution device 13.1, 13.2 through the connection 12. A single distribution device common to the two calibration devices 8.1, 8.2 may be used.

The stimulus generation device 11 may be more complex than making a simple comparison between the signal output by the calibration preamplifier and a threshold. A first variant may be considered using several thresholds, which means that one of more than two transfer functions may be selected for the preamplifiers of a channel.

Other variants are possible. For example, it is possible to take account of information from one or several adjacent elements in the scene, that originate from the scene at the same instant or at an earlier instant.

In FIG. 3, the arrows shown on the stimulus generation block 11 diagrammatically illustrate these various possibilities.

Instead of selecting one among several capacitors, a voltage level or a current level or other levels can be selected depending on the capabilities available with the type of preamplifier, and it would even be possible for the stimulus to control a combination of selections.

It would be possible for the detection device according to the invention to operate with collective control of the transfer function of preamplifiers associated with the useful detectors. All that is necessary is for the stimulation generation devices 11 to output the same stimulus, blocked at a given value, to all preamplifiers when a photo is taken, regardless of the amplitude of the incident photonic flux. For example, it could be imagined that the comparator threshold is chosen outside the range of possible values for signals output by the calibration preamplifier.

One difference with respect to detection devices according to prior art is that the stimulus Sétat is combined with the signal Spixel to obtain the signal SP present at the output from the acquisition system 50, 60, 15. This system includes a multiplexing device 50 that receives the signals Spixel and Sétat from all channels of the detection device. A first output from the multiplexing device is connected to a first output amplifier 60 that outputs the signal SP to the user device. In the example described, the combination between Spixel and Sétat is made at the multiplexing device 50.

It may be possible for a second output from the multiplexing device 50 to be connected to a second output amplifier 50 that outputs a signal SE representing the state of the channel preamplifiers, to the user device.

In general, information acquired by a detection device according to the invention has less saturation pixels and less noise than information obtained with devices according to prior art. The quality of the information obtained from scenes with high contrast is significantly better.

This improvement is made without any a priori knowledge of the characteristics of the scene to be observed.

The calibration device contributes to selection of the optimum state of useful preamplifiers without the need for any counter-reaction or exchange of information with devices external to the detection device.

The transfer function of the useful preamplifiers may also be determined in order to minimize constraints for making analogue circuits on the output side of useful preamplifiers such as the time delay integration device or output circuits.

The possibility of benefiting from a high gain at the preamplifiers has an effect in reducing noise requirements from output side electronics. A preamplifier with a high gain amplifies the information from the detector and its noise. The noise level at the output from the preamplifier is high and it is tolerable if the time delay integration device produces relatively high noise.

One advantage provided by the invention is that more compact transistors can be used within the time delay integration device, which is contrary to design rules for low noise amplifiers. Constraints for installation and routing inside the integration device may be relaxed. The distance between useful detectors along the direction orthogonal to scanning can be reduced when the area of the time delay integration device is reduced.

Another advantage is that it is possible to increase the depth of the time delay integration device. The depth corresponds to the number Nd of useful detectors on a channel, in other words the number of additions made by the time delay integration device.

Each addition is made using analogue operators and is distorted by noise. The integration noise is equal to quadratic sum of the contributions of each analogue operator, as a first approximation. It increases with the depth of the time delay integration device. The fact that a high integration noise is tolerated is a means of increasing the depth of the time delay integration device and consequently improving the signal to noise ratio at the output.

By increasing the gain of useful preamplifiers, requirements on other output side circuits can be relaxed, for example noise on power supplies, amplifiers in the acquisition sequence, robustness with regard to electromagnetic parasites, the number of analogue-digital converter bits.

Information acquired by the detection device according to the invention can be used for various purposes such as imagery, spectrometry, etc.

The invention claimed is:

1. Device for detection of a photonic flux emitted by a scanning type scene comprising at least one acquisition channel (V) comprising:
    several useful detectors (1) aligned parallel to the scanning direction, each associated with a preamplifier (2), designed such that each receives the same fraction of photonic flux from the scene and to supply information representing the received fraction of photonic flux to the associated preamplifiers (2), these preamplifiers (2) outputting an electric signal in response to the information and having a transfer function that can be modified by application of a stimulus (Sétat),
    a time delay integration device (4) for adding and delaying the signals emitted by preamplifiers of the channel (V),
    characterized in that the channel (V) cooperates with at least one calibration device comprising:
    calibration detector (9) located on the input side of the useful detectors (1) along the direction of scanning, designed to receive the fraction of photonic flux before the useful detectors (1) of the channel (V), and
    a stimulus generation device (11) starting from the fraction of flux received by the calibration detector (9),
    and with in addition at least one stimulus distribution device (13) synchronized with scanning, to apply the stimulus to the channel preamplifiers (2) before they have received information from the associated useful detectors (1) the stimulus being able to modify the transfer function of the preamplifiers.

2. Detection device according to claim 1, characterized in that the calibration detector (9) is of the same type as the useful detectors (1).

3. Detection device according to claim 1, characterized in that the preamplifiers (2) of the channel (V) are of the integrator type.

4. Detection device according to claim 3, characterized in that the stimulus (Sétat) selects one integration capacitor (C1) of the channel preamplifiers (2) among several capacitors (C1, C2).

5. Detection device according to claim 1, characterized in that the calibration device (8) comprises a calibration preamplifier (10) connected between the calibration detector (9) and the stimulus generation device (11).

6. Detection device according to claim 5, characterized in that the calibration preamplifier (10) is of the same type as the channel preamplifiers (2).

7. Detection device according to claim 1, characterized in that the stimulus generation device (11) makes a comparison between a signal representing the fraction of photonic flux received by the calibration detector (9) and at least one threshold (S).

8. Detection device according to claim 1, characterized in that the stimulus distribution device (13) is a delay line with one delay cell (14) for each useful detector (1).

9. Detection device according to claim 1, in which the channel (V) cooperates with two calibration devices (8.1, 8.2), one at one end of the channel and the other at the other end, to enable two-directional scanning.

10. Detection device according to claim 1, characterized in that the stimulus generation device (11) is capable of producing a stimulus blocked at a given value, for all channel preamplifiers, regardless of the intensity of the photonic flux originating from the scene, in order to make a collective control of their transfer function.

11. Detection device according to claim 1, characterized in that it comprises means (50) of combining the stimulus (Sétat) with a signal (Spixel) output by the time delay integration device (4).

12. Detection device according to claim 1, characterized in that it is done using the CMOS technology.

13. Scanning type process for detection of a photonic flux emitted by a scene, starting from at least one acquisition channel (V) comprising useful detectors (1) along a line parallel to the direction of scanning, each associated with a preamplifier (2), and each designed to receive the same fraction of photonic flux from the scene and to output information representative of the received fraction of photonic flux to the associated preamplifiers (2), these preamplifiers (2) performing a transfer function that can be modified by application of a stimulus (Sétat) and outputting a signal, in which:
    the fraction of photonic flux originating from the scene is collected in a calibration detector (9) on the input side of the useful detectors (1), before it reaches the useful detectors,
    the stimulus (Sétat) is generated starting from the collected flux fraction,
    this stimulus (Sétat) is distributed synchronously with scanning to the pre-amplifiers (2) of the channel before they have received information from the useful detectors (1), in order to control their transfer function individually,
    the signals output by the channel preamplifiers are integrated after a delay.

* * * * *